United States Patent
Serrano

[15] 3,640,078
[45] Feb. 8, 1972

[54] DEVICES AND METHODS OF CONNECTING TWO INHABITABLE ENCLOSURES UNDER WATER

[72] Inventor: Francisco M. Serrano, Paris, France
[73] Assignee: Compagnie Francaise Des Petroles, Societe Anonyme, Paris, France
[22] Filed: June 4, 1970
[21] Appl. No.: 43,522

[30] Foreign Application Priority Data

June 11, 1969 France..................6919307/69

[52] U.S. Cl. ....................................61/69 A, 285/97
[51] Int. Cl. ............................................B63c 11/34
[58] Field of Search ...............61/69 R, 69 A; 114/16, 7; 49/477

[56] References Cited

UNITED STATES PATENTS

| 1,803,369 | 5/1931 | Teeple et al. | 61/69 A |
| 1,838,566 | 12/1931 | Merritt | 61/69 A |
| 1,912,271 | 5/1953 | Furino | 61/69 A |

FOREIGN PATENTS OR APPLICATIONS 574,209  4/1933  Germany..................49/477

*Primary Examiner*—J. Karl Bell
*Attorney*—Sughrue, Rothwell, Mion, Zinn & Macpeak

[57] ABSTRACT

Apparatus for connecting two underwater inhabitable enclosures at atmospheric pressure, one of them being mobile and the other being anchored on the ocean bottom. The apparatus eliminates leakage caused by the presence of marine concretions on the outer surface of the anchored enclosure. The mobile enclosure comprises a pipe whose open end, having a sealing joint on its periphery, is applied around the opening of the fixed enclosure. The pumping of water from the pipe creates a pressure differential which forces the mobile enclosure into tight engagement with the anchored enclosure. At the periphery of the pipe, the mobile enclosure further comprises an annular chamber defined by two circular knives connected by a flexible membrane, one of the knives having a lip joint on its outer side, and the other having an inflatable joint on its inner side, with a third circular knife positioned within the inflatable joint.

8 Claims, 2 Drawing Figures

PATENTED FEB 8 1972
3,640,078
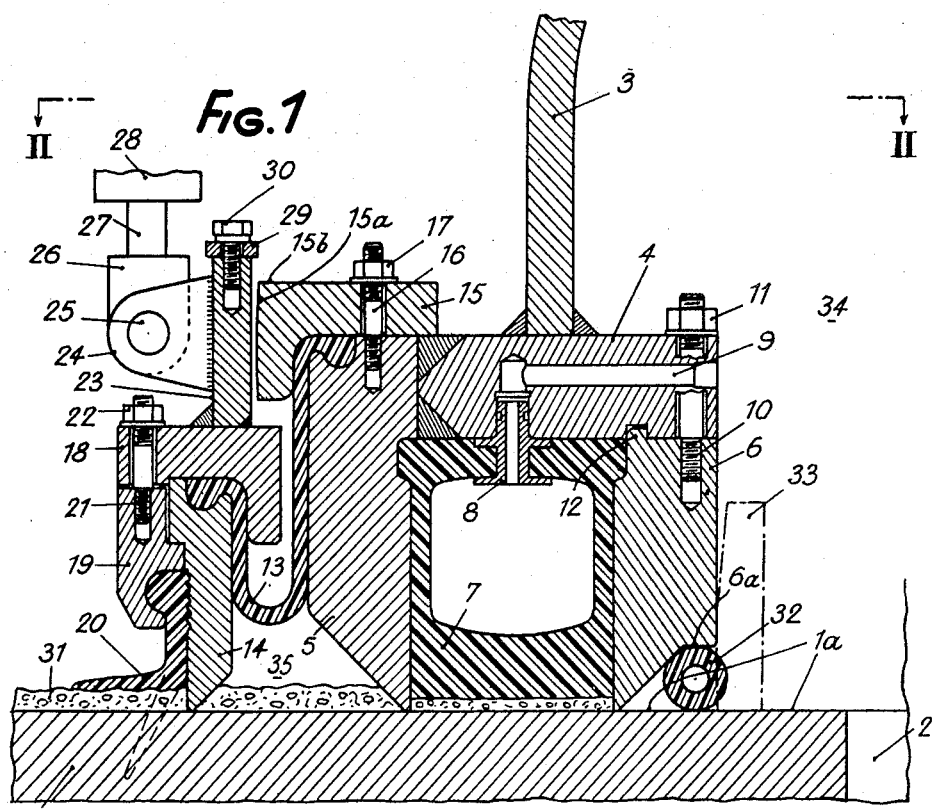
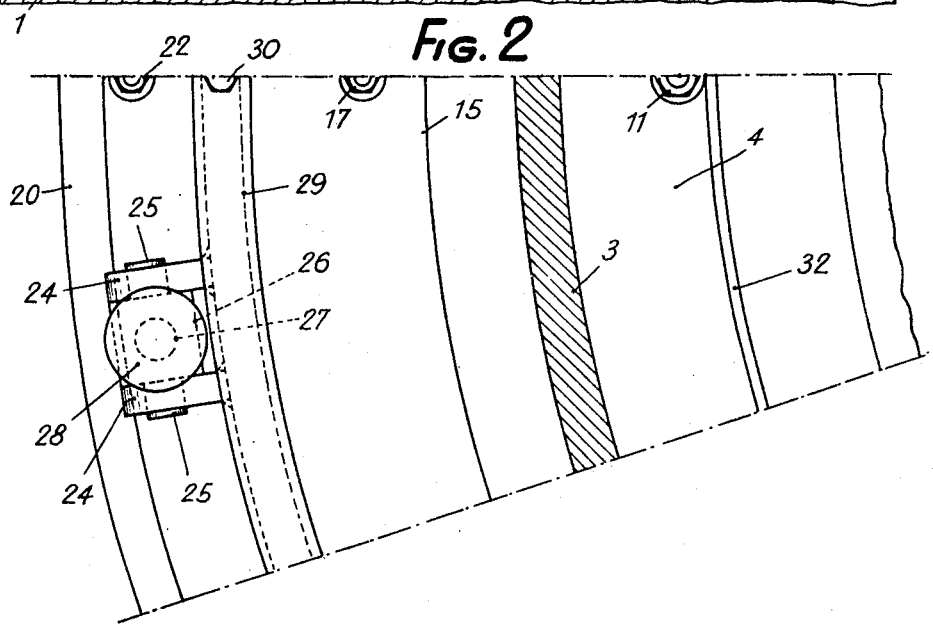

3,640,078

DEVICES AND METHODS OF CONNECTING TWO INHABITABLE ENCLOSURES UNDER WATER

BACKGROUND OF THE INVENTION

This invention relates to an improvement in devices and methods for connecting, underwater, two inhabitable enclosures at atmospheric pressure, one of them being attached to the ocean bottom, the other one being mobile. The invention pertains more particularly to a connection device of this type where the mobile enclosure involves a pipe whose open end, equipped with a joint on its periphery, is applied around the opening of the fixed enclosure, the sealing of the connection being obtained by the pumping of the water contained in said pipe, thus bringing about the application of a large force upon the enclosure by reason of the bottom effect produced by the pressure of the water at the depth at which we make the connection.

Enclosure connection devices of this type furthermore involve an inflatable joint bordering on the end of the pipe, a circular knife shouldering a sealing joint with a lip, as well as a series of support jacks.

Although such devices make it possible to get good tightness, the presence of marine concretions on the surface surrounding the access of the fixed enclosure does not always enable us to obtain the perfect sealing of the knife and of its lip joint, so that water will filter up to the inflatable joint arranged on the pipe of the mobile enclosure. Because of the concretions which can also be found on the span of the inflatable joint and because of the great difference in pressure existing between the interior and exterior of the joint, a substantial water flow may occur in certain cases into the enclosure.

SUMMARY OF THE INVENTION

The object of this invention thus consists in a connection device of this type, improved so as to eliminate the leakage caused by the presence of marine concretions on the rim of the enclosure attached to the ocean bottom, characterized by the fact that the mobile enclosure, at the periphery of its access pipe, involves a ring-shaped chamber delimited by two circular knives connected in their upper portion by a flexible membrane, one of the knives being bordered on the outside by a lip joint, the other one being bordered on the inside by an inflatable joint, said inflatable joint being itself bordered on the inside by a third circular knife.

Contrary to earlier connection devices, where the action of a single knife and of joints was combined with a crown of support jacks, so as to support most of the weight, we distribute the efforts over the knives and over the inflatable joint, in the present invention.

In addition to the advantage deriving from the saving of material, we reduce the weight of the mobile enclosure while increasing the effort made by the knives, thus producing a better destruction of marine concretions without in this way causing a deterioration of the support surface of the threshold of the fixed enclosure.

Another object of the invention is to facilitate the placement of said ring-shaped chamber, while assuring better distribution of weights and while making the assembly of knives more compact, by the addition of a stop, which is fixed with respect to the knives surrounding the inflatable joints, said stop cooperating, through its outside lateral surface, with a piece attached to the upper portion of the outside knife of the ring-shaped chamber, said piece being separated from said stop only by a small leeway and the distance between the knives bordering on the ring-shaped chamber being approximately the same as the distance between the knives surrounding the inflatable joint.

Thus, even the presence of a heavy accumulation of concretions on the surface of the threshold cannot cause the outside knife, bordered by its lip joint, to deviate laterally. On the other hand, the compactness of the device facilitates the depressurizing of the ring-shaped chamber with respect to the outside environment, in other words, it facilitates a firm and faster application of the joint to the outside lip. Finally, since the inflatable joint is applied between its two knives over a distance on the same order as the distance separating the knives of the ring-shaped chamber, we obtain excellent tightness, which is all the better, since the support jacks have been eliminated and since the knives are thus completely driven into the concretions.

Another object of this invention is a ring-shaped chamber assembly for a pipe connecting a mobile enclosure to a fixed enclosure whose placement around the access passage leading to the fixed enclosure is flexible and easy, said assembly being characterized by the addition of jacks connecting said mobile enclosure to the assembly of the outside knife, the ends of the rod of said jacks being articulated with a certain leeway on an assembly attached to the outside knife and cooperating with a stop of the assembly of the inflatable joint, said stop cooperating with said assembly of the outside knife by a curved lateral surface.

It thus suffices to provide sufficient play at the articulation points of the body and of the end of the rod of each jack to permit the assembly of the ring-shaped chamber thus described to assume positions which are slightly inclined with respect to the axis of the pipe, thus giving great flexibility to the connection device, regardless of what might be a possibly poorly distributed thickness of the concretions resting on the threshold of the fixed enclosure.

Another object of the invention is to provide perfect sealing of the connection device by providing, on the lower inside portion of the inside knife bordering on the inflatable joint, a housing portion destined for the insertion of an inflatable safety joint, said joint being supported, on the other hand, by a removal crown bordering on said knife on the inside.

The threshold zone, on which rests the safety joint, is accessible from the inside of the enclosure, after connection, and it therefore, suffices to clean this zone before installing the safety joint and its support crown in order to obtain a perfect application of the safety joint upon the threshold.

Thus, regardless of the leakage from the outside lip joint because of accidental conditions or infiltration, which may even pass below the inflatable joint, caused by a large accumulation of concretions, the safety joint prevents any water from entering the inside of the fixed enclosure after connection and cleaning of the threshold surface.

The invention is applicable to all types of submarine devices; the connection threshold plane need not be horizontal but may assume any inclination. Likewise, the pipe and the jacks articulated on the enclosure may be placed in any suitable position on the submarine device.

BRIEF DESCRIPTION OF THE DRAWING

FIG. 1 shows an elevational view in section of the assembly of joints and knives of the connection device of the present invention, taken along a plane passing through the axis of the pipe of the mobile enclosure, and FIG. 2 is a schematic plan and fragmentary view of the portion of the device situated below plane II—II in FIG. 1, cutting the upper portion of the pipe.

DESCRIPTION OF THE PREFERRED EMBODIMENT

The threshold 1 of fixed enclosure 2 has been shown in the horizontal position for greater clarity in the drawing. Only a small portion of the enclosure 2 has been shown, and FIG. 2 shows a circular form of the enclosure which may be of any suitable shape.

Pipe 3, which is preferably semicylindrical, constitutes a portion of the mobile enclosure to be connected to fixed enclosure 2, whose closing panel has been assumed to have been withdrawn for greater clarity in the drawing.

The lower rim of pipe 3, is welded to piece 4, connecting the upper portions of the inside circular knives 5 and 6, so as to constitute a toric housing for the inflatable joint 7. A mouthpiece 8 is connected to conduit 9, which is connected to another conduit (not shown), leading to a pressurized fluid feed pump (not shown). In the example shown here, the inside circular knife 6 is removable and is attached to the connection piece 4 by a series of screws and nuts 10, 11. Knife 6 and piece 4 are assembled by the penetration of the circular rim 12 of the knife 6 into the corresponding groove of piece 4.

The ring-shaped chamber 35 is bordered by circular knife 5, flexible membrane 13 and outside circular knife 14. The flange at the upper end of membrane 13, penetrating into the groove of knife 5, is retained by stop 15, attached to the knife 5 by screws and nuts 16, 17. The flange at the other end of membrane 13, penetrating into the groove of knife 14, is held by stirrup 18, furthermore holding the retaining piece 19 of the lip joint 20. The stirrup 18 is connected to retaining piece 19 by a series of screws and nuts 21, 22.

An upward extension 23, welded or otherwise attached to stirrup 18, bears attachment lugs 24 for the support of the collar 26 of jack rod 27 bearing pivot shaft 25. Jack body 28 is pivoted to the mobile enclosure in any suitable way by known means, and thus is not shown here.

By way of example, we can have three jacks, such as 28, spaced by approximately 120° one of them having its body rigidly attached to the mobile enclosure, and the other two being pivotally connected thereto.

The lateral outside portion 15a of stop 15 is curved and serves as a guide or stop for the extension 23 of the assembly of knife 14 and its lip joint 20. Furthermore, flat piece 29, attached to the upper end of extension 23 by bolt 30, serves—when the mobile enclosure is not connected to the fixed enclosure and in the absence of any operation of the jacks—to sustain the assembly of the outside portion of the ring-shaped chamber 35 by abutting against the outer portion 15a of piece 15.

When it is desired to connect the mobile enclosure, and thus the pipe 3 to the fixed enclosure 2, we proceed as indicated in the French Pat. application as filed by applicant on Feb. 14, 1969, under No. 6903654, entitled: "Device and Method for Connecting Two Inhabitable Enclosures Under Water." Pipe 3 is filled with water and the panel (not shown) connecting the pipe 3 to the mobile enclosures is closed; we then effect the downward movement of the mobile enclosure until knife 14, held by jacks 28 in its most advanced or downward position, comes to rest on threshold 1 of fixed enclosure 2, as shown in FIG. 1.

The rods 27 of the three jacks 28 remain in the "out" position due to the fact that their feed is assured by a hydraulic accumulator (not shown) which maintains pressure in the jacks. The downward force on knife 14 is thus kept at a constant value for the rest of the operation. Knives 5 and 6, attached to the mobile enclosure, remain withdrawn and do not yet touch the span of the fixed enclosure 2.

After the supporting knife 14 engages the enclosure 2, we effect, with the help of a centrifugal pump (not shown) situated in the mobile enclosure and a power supply (not shown), a slight depression in pressure inside the space 34 in pipe 3 which is in communication with ring-shaped chamber 35, since knives 5 and 6 do not yet touch span 1.

Owing to this pressure differential, and due to the fact that the push of jacks 28 is slightly smaller than it, the knives 5 and 6 are moved into engagement with and supported on the span 1 of fixed enclosure 2.

Primary and incomplete sealing is thus assured by knife 14, which brings about the rupture of the layer 31 of concretions, its lip joint 20 being in engagement with the surface of the threshold or the concretions thereon.

Water in the space 34 in pipe 3 is continually evacuated by the centrifugal pump (not shown) which is always operating. We then simultaneously stop the centrifugal pump, we close its inlet or outlet valve, and we open one large section valve (not shown) which establishes contact between the space 34 within the pipe 3 and the mobile enclosure which is at atmospheric pressure. The pressure inside space 34 of pipe 3 instantly drops to this valve so that the outside ambient pressure forcefully applies the knives 5 and 6 against the concretions on span 1 and destroys them.

Immediately afterwards, we inflate inflatable joint 7 with a suitable liquid, using a circuit (not shown), which improves the tightness produced by knives 5 and 6.

After we inflate joint 7, we again remove any water from the space 34 within pipe 3 and the mobile enclosure which is under atmospheric pressure with the help of the centrifugal pump (not shown) which was mentioned earlier and a conventional pumping circuit which has not been shown here because it can be of any suitable construction.

We did not show any concretions in the zone 1a because this portion is accessible after connection of the enclosures and can be cleaned by hand.

Through the contact of its entire lower surface with the threshold 1, joint 7 stops all infiltration. However, in case of large accumulations of concretions, any leakage is considerably reduced by successive charge losses undergone by the water while passing from the lip joint 20 to the knife edge 6 so that the possible flow resulting from this will not involve any risks and makes it possible to open the access panels of the two connected enclosures. It is then possible, if there is still any flow, to clean the portion of the threshold 1a in the vicinity of enclosure 2, to introduce an inflatable and toric safety joint 32 below the edge 6a provided for this purpose under knife 6, and to put, around this joint, elements 33, resting on the portion 1a of the threshold and whose assembly forms a maintenance or holding crown. It then suffices to inflate joint 32 in order to achieve perfect tightness.

I claim:

1. In a connecting device between a mobile enclosure having an access pipe and a fixed enclosure situated on the ocean bottom, the improvement wherein the mobile enclosure comprises, at the periphery of the access pipe, a pair of circular knives connected at their upper portions by a flexible membrane and defining an annular chamber, a lip joint positioned on the outside of one of the knives, an inflatable joint positioned on the inside of the other knife, and a third circular knife positioned on the inside of the inflatable joint.

2. The device as in claim 1, wherein a stop is provided to keep said one knife at a predetermined distance from said other knife delimiting the ring-shaped chamber and bordering on said inflatable joint, said stop being attached to said other knife.

3. The device as in claim 2, wherein said stop has a lateral surface cooperating with an extension of said one knife so that the distance between said pair of knives defining the ring-shaped chamber is approximately the same as the distance between said other knife and said third knife bordering on said inflatable joint.

4. The device as in claim 3, wherein said stop has a curved lateral surface cooperating with said extension of said one knife.

5. The device as in claim 4, wherein said stop serves to attach one end of said flexible membrane to said other knife.

6. The device as in claim 1, wherein said one knife is connected to the mobile enclosure by a plurality of jacks which are pivotally connected to said one knife.

7. The device as in claim 1, wherein said third knife has in its lower portion and on the side opposite to the inflatable joint, a recessed portion adapted to receive a toric joint, said toric joint being adapted to rest on the inside edge of the threshold of the fixed enclosure, and a crown adapted to rest on the inside edge of the threshold of the fixed enclosure to retain said toric joint in position.

8. The device as in claim 7, wherein said crown is so constructed as to be easily dismantled.

* * * * *